US008321855B2

(12) United States Patent
Ozawa

(10) Patent No.: US 8,321,855 B2
(45) Date of Patent: Nov. 27, 2012

(54) PATCH APPLICATION APPARATUS AND PROGRAM

(75) Inventor: Akitoshi Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1124 days.

(21) Appl. No.: 12/180,998

(22) Filed: Jul. 28, 2008

(65) Prior Publication Data

US 2008/0288934 A1 Nov. 20, 2008

Related U.S. Application Data

(63) Continuation of application No. PCT/JP2006/302563, filed on Feb. 14, 2006.

(51) Int. Cl.
G06F 9/445 (2006.01)
(52) U.S. Cl. ........ 717/168; 717/169; 717/170; 717/174; 717/175
(58) Field of Classification Search .................. 717/168, 717/169, 174, 175
See application file for complete search history.

(56) References Cited

U.S. PATENT DOCUMENTS

| 6,289,510 | B1 | 9/2001 | Nakajima | |
|---|---|---|---|---|
| 6,477,703 | B1* | 11/2002 | Smith et al. | 717/168 |
| 6,996,815 | B2* | 2/2006 | Bourke-Dunphy et al. | 717/168 |
| 2004/0210893 | A1* | 10/2004 | Chamberlain et al. | 717/168 |
| 2006/0048129 | A1* | 3/2006 | Napier et al. | 717/168 |
| 2006/0048130 | A1* | 3/2006 | Napier et al. | 717/168 |
| 2007/0294685 | A1* | 12/2007 | Oh | 717/168 |

FOREIGN PATENT DOCUMENTS

| JP | A-2-110635 | 4/1990 |
|---|---|---|
| JP | A 07-168705 | 7/1995 |
| JP | A-7-168705 | 7/1995 |
| JP | A 09-258966 | 10/1997 |
| JP | A 10-171660 | 6/1998 |
| JP | A 2002-244875 | 8/2002 |
| JP | A 2003-140905 | 5/2003 |
| JP | A 2005-222453 | 8/2005 |
| WO | WO 01/01252 A1 | 1/2001 |

OTHER PUBLICATIONS

T. Kaneko, et al., "Dawn of New Generation Software Development Practical Use of CVS in the XP Era," Software design No. 152, Gijutsu-Hyoron Co. Ltd., Jul. 2003, pp. 180-191.

(Continued)

Primary Examiner — Chat Do
Assistant Examiner — Lynda Dinh
(74) Attorney, Agent, or Firm — Fujitsu Patent Center

(57) ABSTRACT

A patch application method restores a file not to be authorized to change by applying a patch to an original state after applying the patch. A patch application program applies a patch to a part of patch application target files in a system extracts information about the target files from a patch, copies and stores the files as patch pseudo application files, applies the patch to the pseudo files, compares the target files with the pseudo files to which the patch has been applied and obtains a difference, selects a file not to be authorized to change by the patch from among the target files based on the difference, copies and stores the files as post-application change files, applies the patch to the target files, and replaces the files prevented from being changed in the target files changed by the patch application with the post-application change files.

16 Claims, 10 Drawing Sheets

OTHER PUBLICATIONS

T. Ikegami, et al., "The 13$^{th}$ Windows 2000 Server Resource Kit Utilization Course," Windows 2000 World vol. 6, No. 10, IDG Japan, Inc., Oct. 2001, pp. 254-257.

Carzaniga et al.; "A Characterization Framework for Software Deployment Technologies;" Technical Report CU-CS-857-98; Apr. 1, 1998; p. 2, paragraph 2-p. 8, paragraph 3.

Notice of Rejection Ground issued in corresponding Japanese Patent App. No. 2008-500366, dated Aug. 23, 2011 (full English translation).

Jun Monnai, "Small-scale realtime OS for M16C made by an integrated development environment and C compiler, AzkiRTOS"; Third, Interface, CQ Publishing Co. Ltd; Oct. 1, 1999; vol. 25(1), pp. 174-180 (with partial English translation, p. 177).

Yuichiro Naito, "Enjoy videoconference"; BSD Magazine, ASCII Corp., Sep. 14, 2001, No. 9, pp. 119-123 (with partial English Translation, Col. "OS install", line 13-line 29).

* cited by examiner

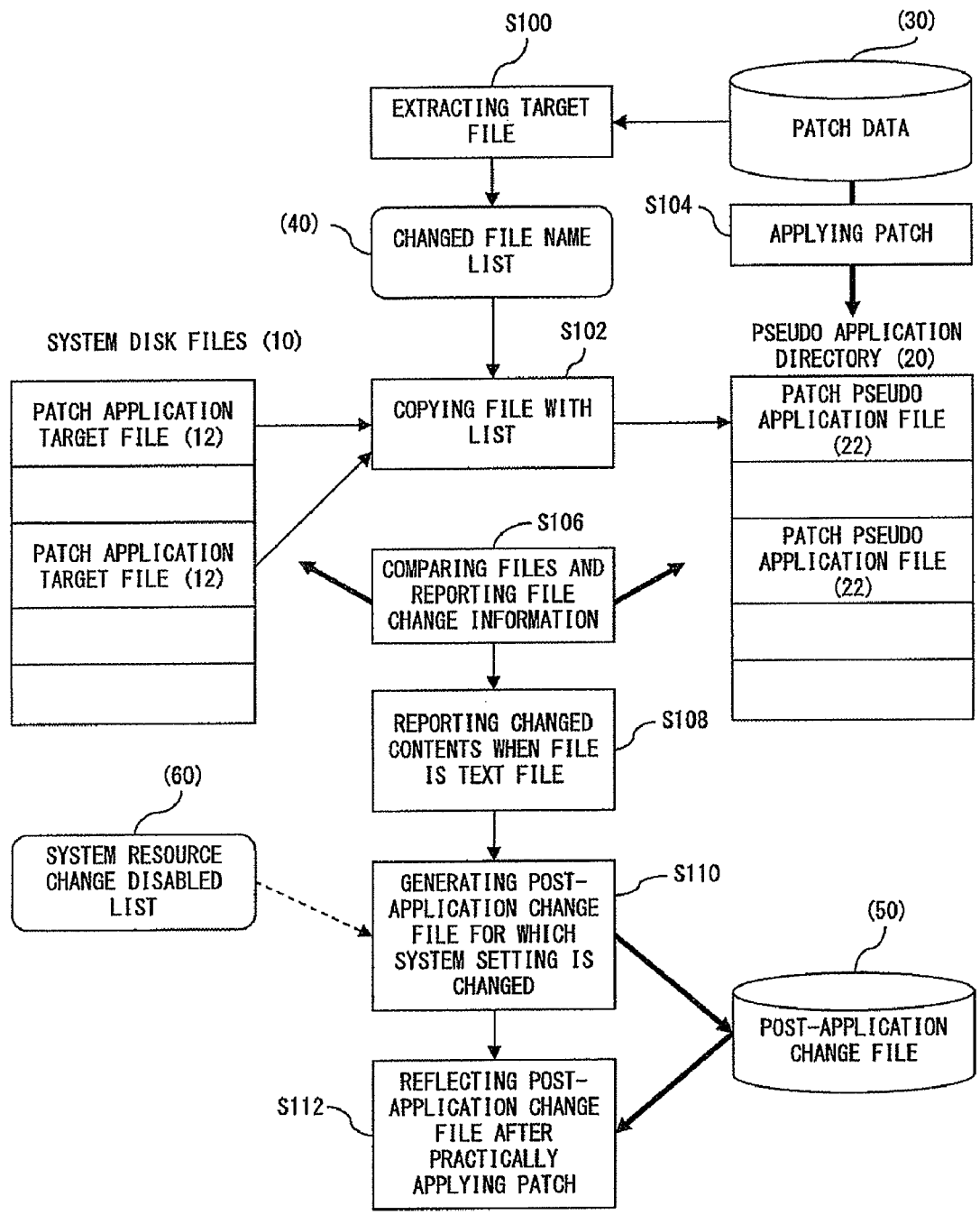
F I G. 1

```
PATCH_ID              : 109007-13
PATCH_INSTALL         : Tue Sep 20 14:13:43 PST 2005
PACKAGE               : SUNWcsr FILE                  : /etc/security/audit_class
FILE TYPE             : ascii text
(system file)         -rw-r--r--    root    sys    728    Jan 6 2000
                      SUM= 56932
(new file)            -rw-r--r--    root    sys    1376   Jun 18 2003
                      SUM= 46621

FILE                  : /etc/security/audit_event
FILE TYPE             : ascii text
(system file)         -rw-r--r--    root    sys    10851  Sep 17 2001
                      SUM= 11100
(new file)            -rw-r--r--    root    sys    12409  Jun 18 2003
                      SUM= 19204

PATCH_ID              : 109007-13
PATCH_INSTALL         : Tue Sep 20 14:13:53 PST 2005
PACKAGE               : SUNWcsu FILE                  : /usr/bin/at
FILE TYPE             : ELF 32-bit MSB executable
(system file)         -rwsr-xr-x    root    sys    37776  Sep 17 2001
                      SUM= 4387
(new file)            -rwsr-xr-x    root    sys    37784  Jun 19 2003
                      SUM= 7320
```

FIG. 4

```
PATCH_ID           : 109007-13
PATCH_INSTALL      : Tue Sep 20 14:13:43 PST 2005
PACKAGE            : SUNWcsr
FILE               : /etc/security/audit_class
FILE TYPE          : ascii text
DIFF               :
<(system file)   (new file)>
22d30
< 0x00000080:pc:process
26d33
< 0x00000800:ad:administrative
28a36, 44
> 0x00010000:ss:change system state
> 0x00020000:as:system-wide administration
> 0x00040000:ua:user administration
> 0x00070000:am:administrative (meta-class)
> 0x00080000:aa:audit utilization
> 0x000f0000:ad:old administrative (meta-class)
> 0x00100000:ps:process start/stop
> 0x00200000:pm:process modify
> 0x00300000:pc:process (meta-class)

FILE               : /etc/security/audit_event
FILE TYPE          : ascii text
DIFF               :
<(system file)   (new file)>
30, 32c37, 40
< 1:AUE_EXIT:exit(2):pc
< 2:AUE_FORK:fork(2):pc
< 3:AUE_OPEN:open(2) - place holder:fa
___
> 1:AUE_EXIT:exit(2):ps
> 2:AUE_FORK:fork(2):ps
> # AUE_OPEN is a placeholder and will not be generated
> 3:AUE_OPEN:open(2) - place holder:no
```

FIG. 5

```
# Files that prohibits change
/usr/kernel/drv/audiocs.conf

# Settings that prohibits change
/usr/kernel/drv/audiots.conf:play-interrupts=50;
/usr/kernel/drv/audiots.conf:record-interrupts=50;
```

FIG. 7

```
PATCH_ID         : 109896-17
PATCH_INSTALL    : Tue Sep 20 21:12:15 PST 2005
PACKAGE          : SUNWauddx
FILE             : /usr/kernel/drv/audiots.conf
FILE TYPE        : ascii text
(system file)     -rw-r--r--    root    sys    1346    Sep 17 2001
                 SUM= 52713
(new file)        -rw-r--r--    root    sys    1353    May 15 2003
                 SUM= 53070
DIFF             :
<(system file)   (new file)>
37, 38c37, 38
< play-interrupts=50;
< record-interrupts=50;
---
> play-interrupts=175;
> record-interrupts=175;

*** NO CHANGE ***
/usr/kernel/drv/audiots.conf:play-interrupts=50;
/usr/kernel/drv/audiots.conf:record-interrupts=50;
******************
```

FIG. 8

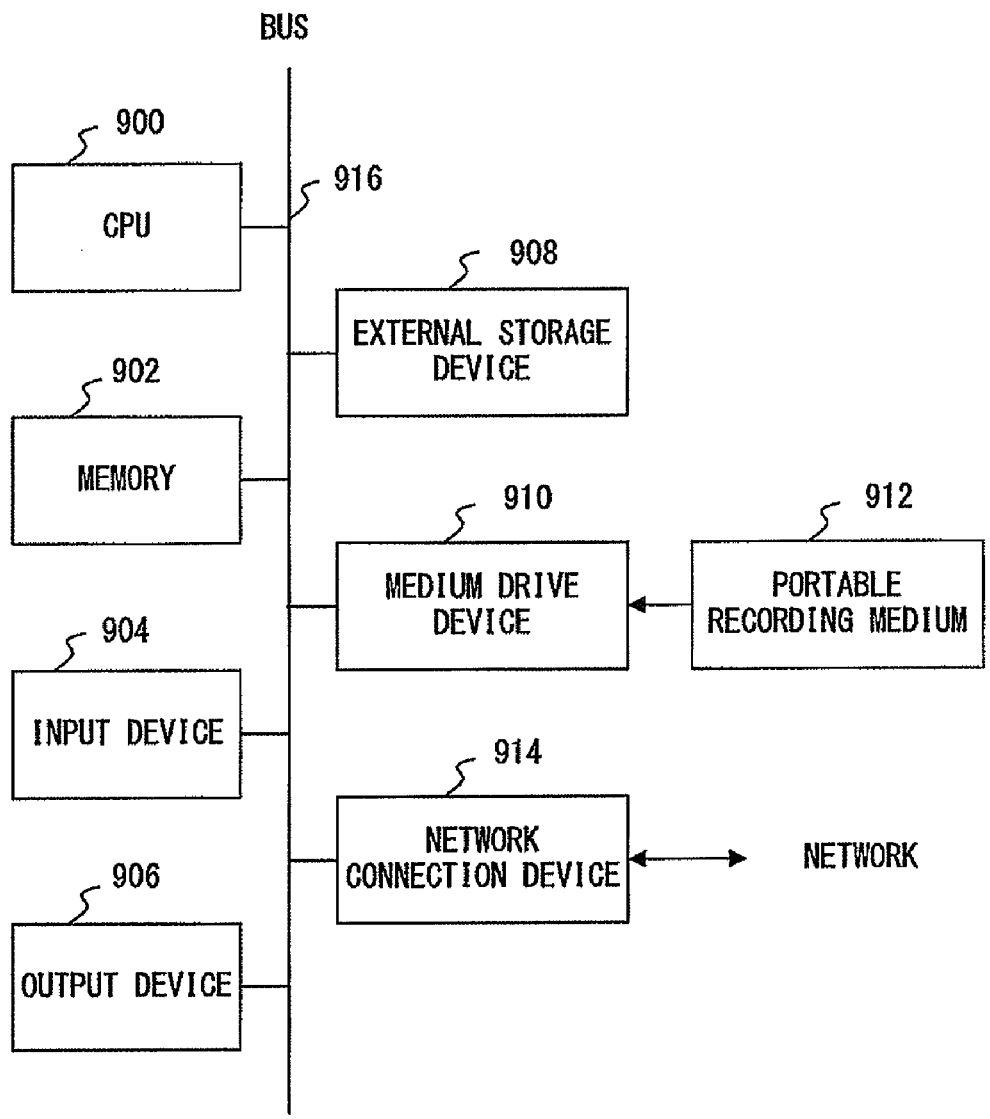
F I G. 9

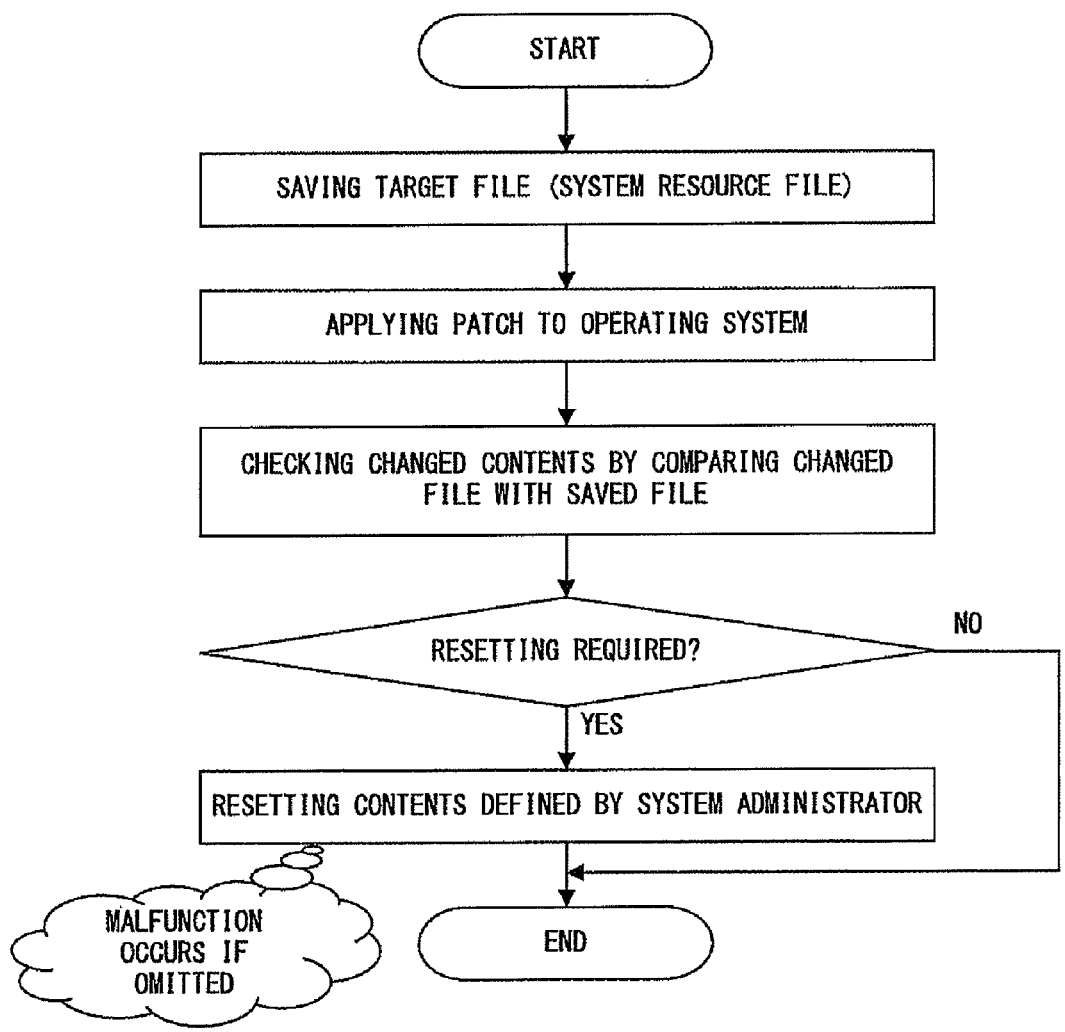
F I G. 10

PATCH APPLICATION APPARATUS AND PROGRAM

CROSS REFERENCE TO RELATED APPLICATION

This application is a continuation of PCT application of PCT/JP2006/302563, which was filed on Feb. 14, 2006.

BACKGROUND OF THE INVENTION

1. Field of the Invention

This application relates to an apparatus and program for applying patch data to at least a part of a plurality of patch application target files in a system.

2. Description of the Related Art

There can be a necessity to apply a patch (patch data) to a product to improve a function etc. after delivering to a client the product as a system of a server etc. In this case, the patch data is normally brought to the client, and applied to the product. However, in many cases, a system resource file (file whose settings are changed by a system administrator) of a product is changed from the default after the delivery of the product depending on the convenience of a purchaser of the product. If a patch is applied to a product with the system resource file changed, then the system resource file may be forcibly replaced and rewritten by a certain patch data. If the operation of the product is resumed in this state, the operation is different from that performed before the application of the patch because the system resource file has been changed, thereby possibly bringing about trouble to the purchaser. Since the level of the influence of a patch application is known only after the application of the patch, the currently available method is to separately hold the state before a patch application as disclosed by the patent document 1 (Japanese Published Patent Application No. H2-110635), apply a patch, and restore the state to the original state if any trouble occurs.

However, in the conventional patch application method disclosed by the patent document 1, a patch is applied by copying a file to be amended in a separate area, but file contents changed by the patch application are not checked. As shown in FIG. 10, in the conventional technology, a patch application target file (system resource file) is first saved (backup copy), and then a patch is applied to an operating system. Then, the file whose contents have been changed by the application of the patch is individually compared with the saved file to check the changed contents. If a resetting is required as a result of the check, the system administrator individually performs resetting in a series of operations. Without the resetting operation, a malfunction occurs in the system. Therefore, it is necessary to check and reset each system resource file after the application of a patch, thereby causing the problem that a badly troublesome operation is required each time a patch is applied.

SUMMARY OF THE INVENTION

To solve the above-mentioned problems, an embodiment of the present invention aims at providing a program capable of applying patch data to a plurality of patch application target files in a system, and restoring a file not to be authorized to change by the patch to its original state after the application of the patch.

The patch application program according to an embodiment of the present invention directs a computer having a storage device to perform a process of applying patch data to at least a part of a plurality of patch application target files in a system, and the process includes the acts of:

extracting information about the plurality of patch application target files from the patch data stored in the storage device;

copying the plurality of patch application target files according to the extracted information about the plurality of patch application target files, and storing the files as a patch pseudo application file in the storage device;

applying the patch data to the patch pseudo application file;

comparing the plurality of patch application target files with the patch pseudo application file to which the patch data is applied, and obtaining a difference;

selecting a file not to be authorized to change by the patch data from among the plurality of patch application target files on the basis of the difference, copying and storing the file as a post-application change file in the storage device;

applying the patch data to the plurality of patch application target files; and replacing the file not to be authorized to change of the patch application target files changed by applying the patch data with the post-application change file.

The patch application program according to an embodiment of the present invention is stored in a storage device of a computer, that is, an external storage device (908) or a portable recording medium (912) in the hardware configuration, then stored in memory (902), and executed by a CPU (900). The patch application program according to an embodiment of the present invention can be input by an input device (904), and stored in a storage device through a network connection device (914).

BRIEF DESCRIPTION OF THE DRAWINGS

FIG. 1 shows the principle of embodiments of the present invention in outline;

FIG. 4 shows an example of displaying the comparison between file information according to embodiments of the present invention;

FIG. 5 shows an example of displaying the difference between the file contents according to embodiments of the present invention;

FIG. 7 shows an example of a system resource file change disabled list according to Embodiment 3 of the present invention;

FIG. 8 shows an example of displaying the difference between file contents during automatic update according to Embodiment 3 of the present invention;

FIG. 9 shows the outline of the hardware configuration according to embodiments of the present invention; and FIG. 10 shows the problem with the patch application method of the conventional technology.

DESCRIPTION OF THE EMBODIMENTS

Figure 2:
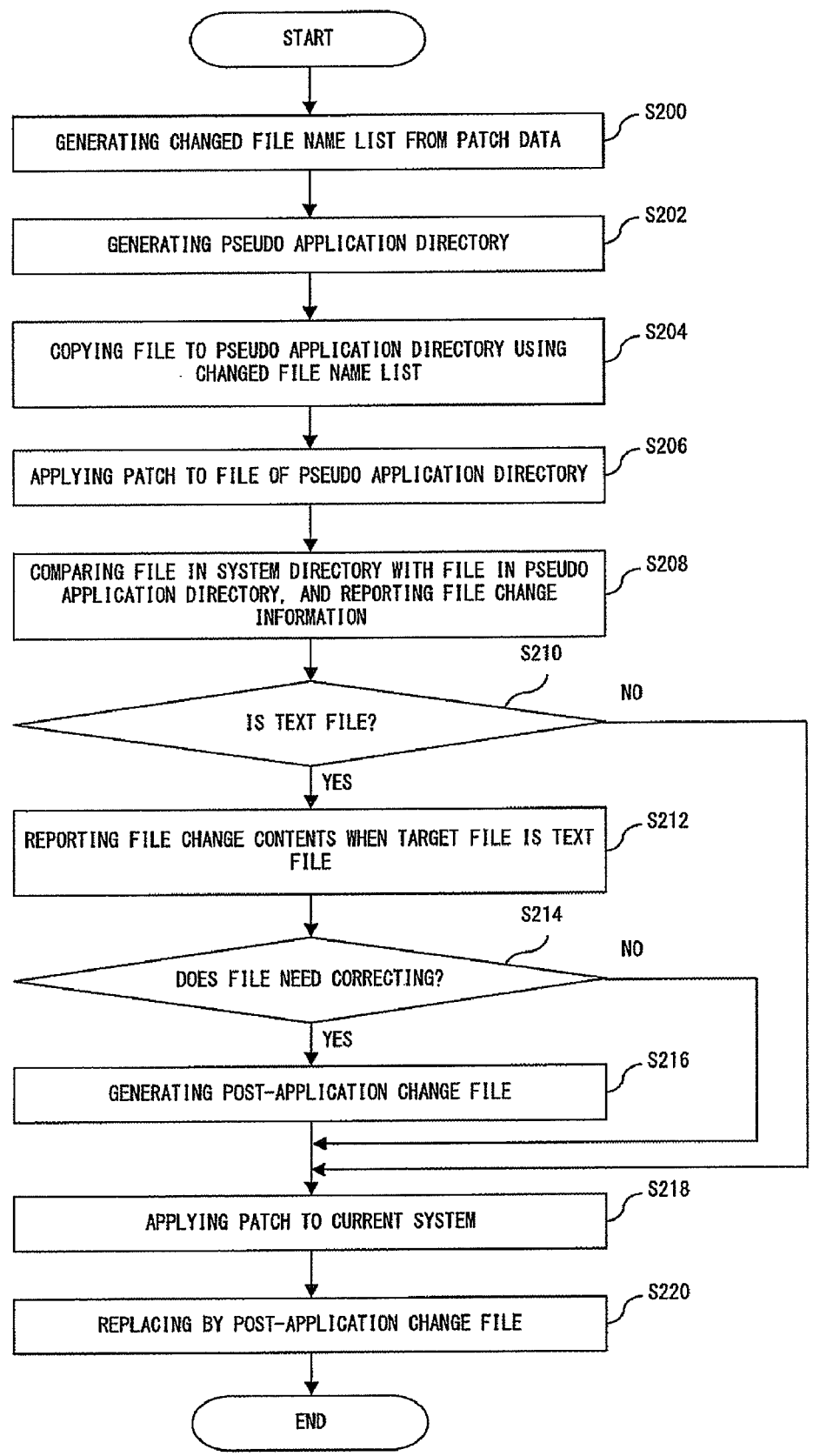
FIG. 2 is a flowchart illustrating Embodiment 1 of the present invention.

The present invention is described below in detail with reference to the attached drawings and examples of the embodiments, but the present invention is not limited to those embodiments.

In the descriptions below, a plurality of files configuring the system (10) are assumed to be stored in one recording medium for convenience, but the program, the apparatus, and the method according to an embodiment of the present invention can also be applied to the system stored as distributed to a plurality of recording media and the system stored as distributed over a network.

In addition, in the descriptions below, a target file is assumed to be a system resource file (file whose settings are changed by a system administrator) for convenience, but an embodiment of the present invention is not limited to such the application, but can be generally used for a common file.

FIG. 1 shows the principle of the present invention in outline. The program according to the present invention works on a system (10) including a plurality of files. In the operation of the program according to the present invention, a file (patch application target file (12)) to which a patch is applied is first extracted from a patch data (30) before practically applying the patch data (30) to the system (10), and a changed file name list (40) is prepared (S100). Next, based on the changed file name list, the patch application target file (12) is copied as a patch pseudo application file (22) to a pseudo application directory (20) (S102). Then, the patch data (30) is applied to the patch pseudo application file (22) in the pseudo application directory (20) (S104).

Afterwards, the patch application target file (12) is compared with the patch pseudo application file (22) to which the patch data (30) is applied to obtain a difference, and the information about the changed file is reported (S106). If the patch application target file (12) is a text file, the contents of the difference is reported as necessary (S108).

Based on the above-mentioned difference, it is checked whether or not the system settings are to be changed, a file not to be authorized to change in the patch application target files (12) is copied, and stored as a post-application change file (50) (S110). At this time, when there is a file not to be definitely authorized to change, a change disabled file list (60) can be prepared, and the post-application change file (50) can be prepared based on the list.

Finally, after practically applying the patch data (30) to the patch application target file (12), the post-application change file (50) is reflected by the system (10), thereby restoring the file not to be authorized to change in the patch application target files (12) to the state before the application of the patch, and terminating a series of procedures.

According to the program of the present invention, when patch data is applied to a plurality of patch application target files in a system, a file not to be authorized to change by a patch can be collectively restored to an original state after applying the patch, thereby eliminating the necessity to individually perform a resetting operation etc. of a system resource file each time a patch is applied.

Embodiment 1

Embodiment 1 of the present invention is an example in which the pseudo application directory (20) is generated on the same recording medium as the current system (system directory) (10).

FIG. 2 is a flowchart illustrating Embodiment 1 of the present invention. In the procedure of Embodiment 1, the changed file name list (40) is first generated from the patch data (30) (S200), and the pseudo application directory (20) is generated on the same recording medium as the system directory (10) (S202). Based on the changed file name list (40), the patch application target file (12) is copied as the patch pseudo application file (22) to the pseudo application directory (20) (S204), and then the patch data (30) is applied to the patch pseudo application file (22) (S206).

The system directory (10) is compared with the pseudo application directory (20), and the information about the file to be changed by applying a patch is reported (S208). At this time, if a changed file is a text file (S210), the file change contents is reported (S212), and a file determined (S214) to be amended after a patch application (the file is not to be changed) is copied, and stored as the post-application change file (50) (S216). It is noted that in this example the post-application change file (50) is described as a text file, but the post-application change file (50) may also be generated for a binary file.

Then, if the patch data (30) is practically applied to the current system directory (10) (S218), then a part of the files in the system (10) after the patch application are replaced with the post-application change file (50) (S220), thereby terminating the procedure.

Embodiment 2

Figure 3:
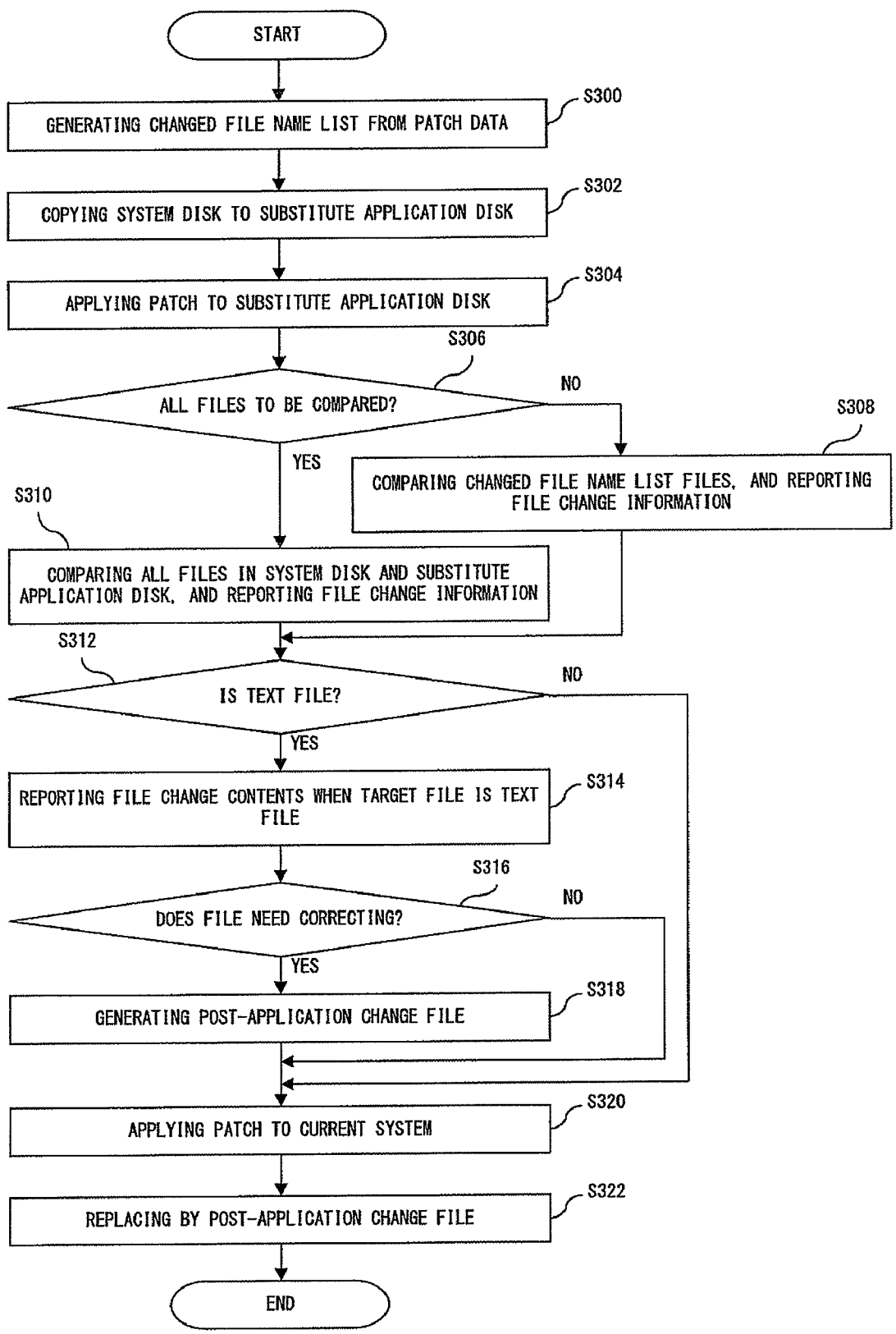
FIG. 3 is a flowchart illustrating Embodiment 2 of the present invention.

FIG. 3 is a flowchart illustrating Embodiment 2 of the present invention. In Embodiment 2, the entire recording medium (for example, a disk in this example) including the system is copied instead of individually generating a pseudo application directory as in Embodiment 1.

In the procedure of Embodiment 2, the changed file name list (40) is first generated from the patch data (30) (S300). Next, the entire contents of the disk (system disk) including the system (10) are copied to another recording medium (substitute application disk) (S302), and the patch data (30) is applied to the substitute application disk (S304).

Then, it is determined whether or not all files of the system disk are to be compared with all files of the substitute application disk (S306). When all files are compared, the file change information about all files are reported (S310). When all files are not compared, files are compared based on the changed file name list (40) prepared in the same procedure as in Embodiment 1, and the file change information is reported (S308). At this time, if a file to be changed is text file (S312), the file change contents are reported (S314), and correspondingly the file determined to be amended after a patch application (the file is not authorized to change) (S316) is copied and stored as the post-application change file (50) (S318).

Afterwards, the patch data (30) is applied to the system disk (10) practically (S320), and the post-application change file (50) replaces the file of the system disk (10) after the patch application, thereby terminating the procedure.

FIG. 4 shows an example of displaying the reported file change information. In this example, "PATCH_ID" (ID of patch data), "PATCH_INSTALL" (date and time of installation of patch data), and "PACKAGE" (package type) are displayed as the information about patch data. As the information about the file to be changed by each piece of patch data, "FILE" (file path), and "FILE TYPE" (file type) are displayed, and a permission, a user name, a group name, a file size, an update date and time, and a checksum are displayed for each of "(system file)" (system file before patch application) and "(new file)" (file after patch application) are displayed.

FIG. 5 shows an example of displaying the comparison (difference) between the contents of reported file. As in FIG. 4, "PATCH_ID", "PATCH_INSTALL", "PACKAGE", "FILE", and "FILE TYPE" are also displayed. Furthermore, the difference between "(system file)" and "(new file)" and the line numbers of the different lines are displayed as "DIFF".

Embodiment 3

Figure 6:
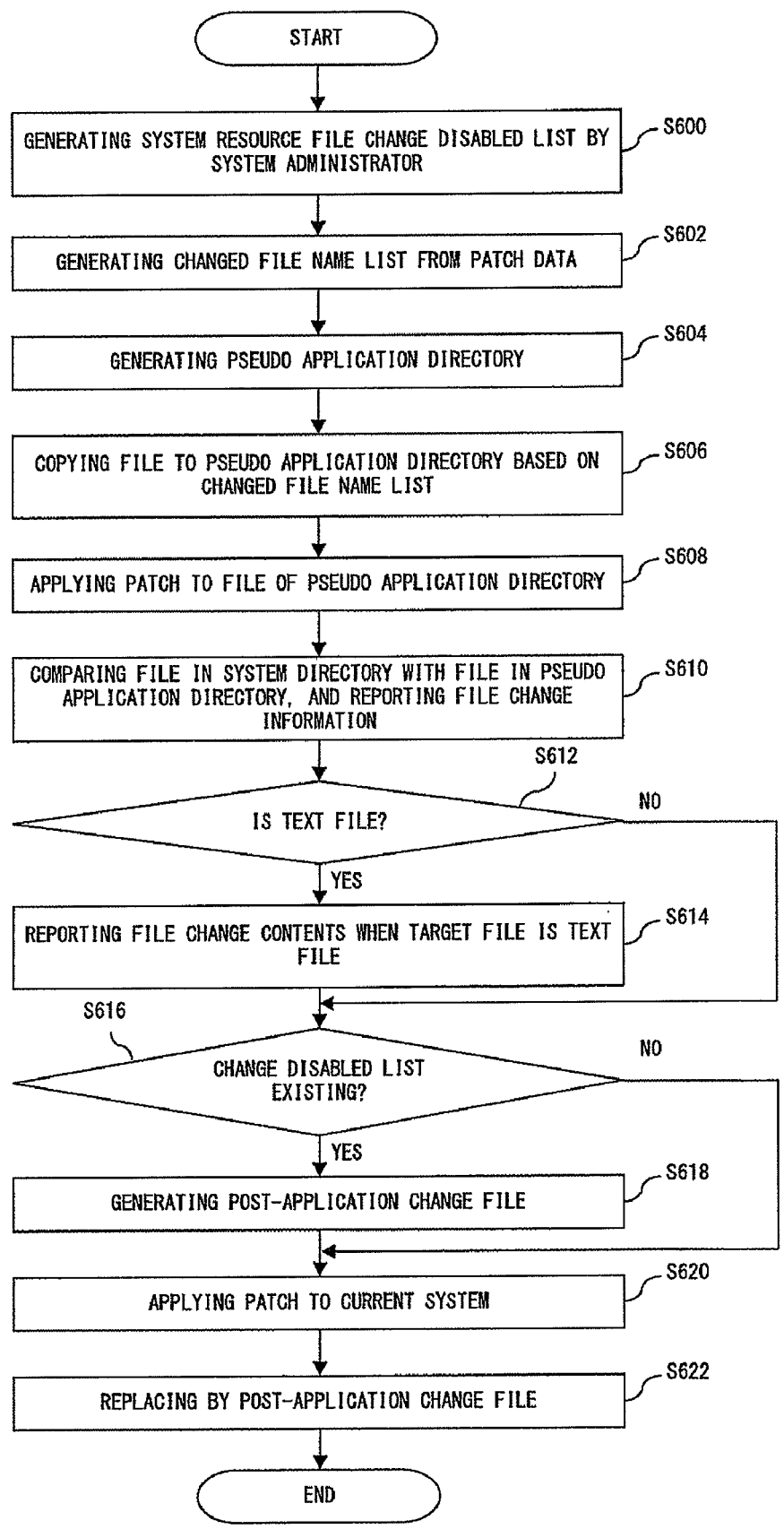
FIG. 6 is a flowchart illustrating Embodiment 3 of the present invention.

FIG. 6 shows a flowchart illustrating Embodiment 3 according to the present invention. In Embodiment 3, a system administrator etc. prepares in advance a list of change disabled files (system resource file change disabled list) for system resource files, thereby reserving in advance a file not to be authorized to change when a patch is applied.

First, the system resources change disabled list (60) is generated (S600), the changed file name list (40) is generated from the patch data (30), the pseudo application directory (20) is generated (S604), the patch application target file (12) is copied as the patch pseudo application file (22) to the pseudo application directory (20) on the basis of the changed file name list (40) (S606).

Then, the patch data (30) is applied to the patch pseudo application file (22) (S608).

Afterwards, the system disk (10) is compared with the pseudo application directory (20), and the information about the files to be changed by applying a patch is reported (S610). At this time, if a changed file is a text file (S612), the file change contents are reported (S614).

Then, it is determined whether or not the patch application target file (12) to be changed by applying a patch is described in the system resources change disabled list (60) (S616), the described file is copied and stored as the post-application change file (50) (S618).

When the patch data (30) is practically applied to the system directory (10) (S620), a part of the files of the system (10) after applying a patch are replaced with the post-application change file (50) (S622), thereby terminating the procedure.

It is also possible to combine the above-mentioned embodiments. For example, as in Embodiment 3, the generation and automatic update of the post-application change file (50) on the basis of the system resources change disabled list (60) can be combined with the generation of the post-application change file (50) on the basis that the whether a change is to be approved according to the notification of the file change contents in Embodiment 1.

FIG. 7 shows an example of a system resources change disabled list, and shows a path of a change disabled file and a path and settings of a change disabled file.

FIG. 8 shows an example of displaying the comparison (difference) between the contents of reported files in the automatic update as in Embodiment 3. As in FIG. 5, "PATCH_ID", "PATCH_INSTALL", "PACKAGE", "FILE", "FILETYPE", and "DIFF" are displayed also in FIG. 8. Furthermore, a change disabled file and its settings are listed as "NO CHANGE".

The above-mentioned embodiments can be realized by a computer program, but the computer program can be recorded on a computer-readable recording medium, and the program recorded on the recording medium can be read to the computer and executed to realize the embodiments.

FIG. 9 shows the outline of the hardware configuration of an embodiment of the present invention. The CPU (900), the memory (902), the input device (904), an output device (906), the external storage device (908), a medium drive device (910), the portable recording medium (912), and the network connection device (914) are connected via a bus (916). A program according to an embodiment of the present invention can be stored in portable recording medium (912) or the portable recording medium (912) driven by the external storage device (908). The hardware can be connected to a network through the network connection device (914), and the program relating to an embodiment of the present invention can be input or output through the input device (904) and the output device (906).

By detecting in advance a change in files at a patch application, a file not to be authorized to change by a patch application can be automatically and selectively restored to an original state after the application of a patch.

What is claimed is:

1. A non-transitory machine-readable medium storing therein program used to direct a computer to perform a process comprising:
   extracting information about a plurality of patch application target files stored in a storage device from patch data to be applied to at least one of the plurality of patch application target files, the extracting being performed before applying the patch data to the patch application target files;
   copying each of the plurality of patch application target files indicated by the extracted information as one of a plurality of patch pseudo application files;
   applying the patch data to the plurality of patch pseudo application files;
      obtaining a difference between each individual patch application target file in the plurality of patch application target files and one of the plurality of patch pseudo application files that is obtained by coping the individual patch application target file and applying the patch data;
   selecting a setting file used for system setting not to be authorized to change according to the patch data from among the plurality of patch application target files using the difference;
   copying the setting file as a post-application change file;
      applying the patch data to the plurality of patch application target files including the setting file; and
   replacing the setting file not to be authorized to change of the patch application target files changed by applying the patch data with the post-application change file.

2. The non-transitory machine-readable medium according to claim 1, wherein
   the plurality of patch application target files are a plurality of system resource files set and changed by a system administrator.

3. The non-transitory machine-readable medium according to claim 1, further directing the computer to perform:
   reporting the difference.

4. The non-transitory machine-readable medium according to claim 3, wherein
   the reporting the difference reports the difference when the plurality of patch application target files include a text file.

5. The non-transitory machine-readable medium according to claim 1, further directing the computer to perform:
   generating a change disabled file list; and
   eliminating a file described in the change disabled file list from targets to which the patch data is applied.

6. The non-transitory machine-readable medium according to claim 1, wherein
   the information about the plurality of patch application target files includes a file type, a file size, a checksum, or an update date and time.

7. The non-transitory machine-readable medium according to claim 1, wherein
   the patch pseudo application file is copied to and generated in a pseudo application directory of a disk including the system.

8. The non-transitory machine-readable medium according to claim 1, wherein
   the patch pseudo application file is copied to and generated in a substitute application disk other than the disk including the system.

9. A patch application apparatus comprising:

a storage device configured to store patch data to be applied to at least one of a plurality of patch application target files;

an extraction device configured to extract information about the plurality of patch application target files stored in the storage device from the patch data before applying the patch data to the patch application target files;

a copying device configured to copy each of the plurality of patch application target files indicated by the extracted information as one of a plurality of patch pseudo application files;

a patch application device configured to apply the patch data to the plurality of patch pseudo application target files;

a difference acquisition device configured to obtain a difference between each individual patch application target file in the plurality of patch application target files and one of the plurality of patch pseudo application files that is obtained by coping the individual patch application target file and applying the patch data; and a change approval device
configured to select a setting file used for system setting not to be authorized to change according to the patch data from among the plurality of patch application target files using the difference obtained by the difference acquisition device, and
configured to copy the setting file as a post-application change file, wherein after the patch application device applies the patch data to the plurality of patch application target files including the setting file, the setting file changed by the patch application device not approved by the change approval device in the plurality of patch application target files is replaced with the post-application change file.

10. The apparatus according to claim 9, wherein
the plurality of patch application target files are a plurality of system resource files set and changed by a system administrator.

11. The apparatus according to claim 9, further comprising a notification device configured to notify of the difference.

12. The apparatus according to claim 9, further comprising a patch application target configured to limit device generating a change disabled file list, and configured to eliminate the file described in the change disabled file list from targets to which the patch data is applied.

13. The apparatus according to claim 9, wherein
the information about the plurality of patch application target files includes a file type, a file size, a checksum, or an update date and time.

14. The apparatus according to claim 9, wherein
the patch pseudo application file is generated by copying to a pseudo application directory of a disk including the system.

15. The apparatus according to claim 9, wherein
the patch pseudo application file is generated by copying to a substitute application disk other than the disk including the system.

16. A patch application method used to direct a computer to perform a process comprising:

extracting information about a plurality of patch application target files stored in a storage device from patch data to be applied to at least one of the plurality of patch application target files, the extracting being performed before applying the patch data to the patch application target files using an extraction device;

copying each of the plurality of patch application target files indicated by the extracted information as one of a plurality of patch pseudo application files using a copying device;

applying the patch data to the plurality of patch pseudo application files using an application device;

obtaining a difference between each individual patch application target file in the plurality of patch application target files and one of the plurality of patch pseudo application files that is obtained by coping the individual patch application target file and applying the patch data;

selecting a setting file used for system setting not to be authorized to change by the patch data from among the plurality of patch application target files using the difference;

copying the setting file as a post-application change file using a change approval device;

applying the patch data to the plurality of patch application target files including the setting file using the patch application device; and replacing the setting file not to be authorized to change of the patch application target files changed by applying the patch data with the post-application change file using the change approval device.

\* \* \* \* \*